US012615625B2

(12) United States Patent
Nakagawa

(10) Patent No.: US 12,615,625 B2
(45) Date of Patent: Apr. 28, 2026

(54) COMMUNICATION SYSTEM, COMMUNICATION METHOD, AND RECORDING MEDIUM RECORDING COMMUNICATION PROGRAM

(71) Applicant: SHARP KABUSHIKI KAISHA, Sakai City (JP)

(72) Inventor: Katsuya Nakagawa, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 707 days.

(21) Appl. No.: 18/097,176

(22) Filed: Jan. 13, 2023

(65) Prior Publication Data

US 2023/0247597 A1     Aug. 3, 2023

(30) Foreign Application Priority Data

Feb. 3, 2022     (JP) ................................. 2022-015592

(51) Int. Cl.
*H04W 72/0446*          (2023.01)

(52) U.S. Cl.
CPC .............................. *H04W 72/0446* (2013.01)

(58) Field of Classification Search
CPC ................................................. H04W 72/0446
See application file for complete search history.

(56) References Cited

U.S. PATENT DOCUMENTS

2004/0066768 A1     4/2004  Yeh et al.

FOREIGN PATENT DOCUMENTS

| JP | 2004-129235 A | 4/2004 |
| JP | 2008-227835 A | 9/2008 |
| JP | 2019047353 A | * 3/2019 ........... H05B 47/196 |

* cited by examiner

*Primary Examiner* — Melvin C Marcelo
(74) *Attorney, Agent, or Firm* — ScienBiziP, P.C.

(57)          ABSTRACT

In a communication system in which a plurality of master stations wirelessly communicate with a plurality of slave stations in a predetermined cycle, each of the plurality of slave stations being associated with one of the plurality of master stations, and the communication system includes: an allocation processor that allocates the plurality of master stations respectively to a plurality of temporal intervals resulting from time-division of the predetermined cycle, in a predetermined channel; and a communication processor that, in each of the plurality of temporal intervals, causes the master station to communicate with a plurality of slave stations associated with the master station, within that temporal interval.

15 Claims, 10 Drawing Sheets

| TAG ID | POSITION INFORMATION | PART'S NAME |
|--------|----------------------|-------------|
| tg0001 | p1 | A1 |
| tg0002 | p2 | A2 |
| tg0003 | p3 | A3 |
| ⋮ | ⋮ | ⋮ |
| tg0500 | p500 | A500 |

| CONTROLLER ID | TAG ID |
|---------------|--------|
| c0001 | tg0001 ～ tg0100 |
| c0002 | tg0101 ～ tg0200 |
| c0003 | tg0201 ～ tg0300 |
| c0004 | tg0301 ～ tg0400 |
| c0005 | tg0401 ～ tg0500 |

| | | FREQUENCY CHANNEL | | | | |
| --- | --- | --- | --- | --- | --- | --- |
| | | 1 | 2 | 3 | 4 | 5 |
| SLOT NUMBER | 1 | 1 | 15 | 30 | 39 | 53 |
| | 2 | 2 | 16 | 31 | 40 | 54 |
| | 3 | 3 | 17 | 32 | 41 | 55 |
| | 4 | 4 | 18 | 33 | 42 | 56 |
| | 5 | 5 | 19 | 34 | 43 | 57 |
| | 6 | 6 | 20 | 35 | 44 | 58 |
| | 7 | 7 | 21 | 36 | 45 | 59 |
| | 8 | 8 | 22 | 37 | 46 | 60 |
| | 9 | 9 | 23 | 38 | 47 | 61 |
| | 10 | 10 | 24 | 39 | 48 | 62 |
| | 11 | 11 | 25 | | 49 | 63 |
| | 12 | 12 | 26 | | 50 | 64 |
| | 13 | 13 | 27 | | 51 | |
| | 14 | 14 | 28 | | 52 | |
| | 15 | | 29 | | | |
| | 16 | | | | | |

COMMUNICATION SYSTEM, COMMUNICATION METHOD, AND RECORDING MEDIUM RECORDING COMMUNICATION PROGRAM

INCORPORATION BY REFERENCE

This application is based upon and claims the benefit of priority from the corresponding Japanese Patent Application No. 2022-015592 filed on Feb. 3, 2022, the entire contents of which are incorporated herein by reference.

BACKGROUND

The present disclosure relates to a communication system, a communication method, and a recording medium recording therein a communication program.

Such a communication scheme (time division multiple access:TDMA) has been known, in which one master station (also referred to as "controller" or "host") occupies a single channel, and sequentially communicates with a plurality of slave stations (also referred to as "slave") allocated to the master station, in a time-division manner. Each slave station is allocated with a certain time which is immediately after reception of communication (transmission data) from the master station, as a time communicable with a host.

In factories and warehouses, etc., operators perform picking operations to pick articles stored in storage shelves. A picking system to optimize the picking operations has been introduced. In the picking system, a plurality of storage shelves, a slave station (tag having a communication function) provided for each storage shelf, and a master station (controller) to control the plurality of tags are provided in an operation area. The controller transmits a command (which may include a lighting instruction) to a tag of a storage shelf in which an article to be picked is stored, and lights a lamp (LED) provided for the tag. An operator picks a target article from the storage shelf whose lamp is lit.

High-speed responsiveness is required of the aforesaid picking system; however, conventional technologies can only maintain limited levels of high-speed responsiveness while deploying a multitude of slave stations in wider areas and increasing the communication amount. Usage of a multitude of channels by dividing frequencies so as to deploy a multitude of slave stations in wider areas is possible; however, if the number of channels is limited, communication with a multitude of slave stations, while maintaining high-speed responsiveness, is difficult.

An object of the present disclosure is to provide a communication system, a communication method, and a recording medium recording therein a communication program, according to which a multitude of slave stations can be deployed while maintaining high-speed responsiveness in communication between a master station and a slave station.

SUMMARY

In a communication system according to an embodiment of the present disclosure, a communication system, a plurality of master stations wirelessly communicate with a plurality of slave stations in a predetermined cycle. The communication system includes an allocation processor and a communication processor. Each of the plurality of slave stations being associated with one of the plurality of master stations. The allocation processor allocates the plurality of master stations respectively to a plurality of temporal intervals resulting from time-division of the predetermined cycle, in a predetermined channel. The communication processor, in each of the plurality of temporal intervals, causes the master station to communicate with a plurality of slave stations associated with the master station, within that temporal interval.

In a communication method according to an embodiment of the present disclosure, a plurality of master stations wirelessly communicate with a plurality of slave stations in a predetermined cycle. Each of the plurality of slave stations being associated with one of the plurality of master stations. The communication method causing one or a plurality of processors to perform: an allocation step of allocating the plurality of master stations respectively to a plurality of temporal intervals resulting from time-division of the predetermined cycle, in a predetermined channel; and a communication step of causing the master station to, in each of the plurality of temporal intervals, communicate with a plurality of slave stations associated with the master station, within that temporal interval.

A recording medium according to an embodiment of the present disclosure records therein a communication program by which a plurality of master stations wirelessly communicate with a plurality of slave stations in a predetermined cycle. The communication program causes one of a plurality of processors to perform an allocation step and a communication step. Each of the plurality of slave stations is associated with one of the plurality of master stations, and the allocation step allocates the plurality of master stations respectively to a plurality of temporal intervals resulting from time-division of the predetermined cycle, in a predetermined channel. The communication step causes the master station to, in each of the plurality of temporal intervals, communicate with a plurality of slave stations associated with the master station, within that temporal interval.

The present disclosure provides a communication system, a communication method, and a recording medium recording therein a communication program, according to which a multitude of slave stations can be deployed while maintaining high-speed responsiveness in communication between a master station and a slave station.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIG. 4 illustrates an example of tag information stored in a storage of the communication system, according to an embodiment of the present disclosure.

FIG. 5 illustrates an example of association information stored in the storage of the communication system, according to an embodiment of the present disclosure.

FIG. 6 illustrates a correspondence relationship between controllers and tags, according to an embodiment of the present disclosure.

FIG. 12 illustrates how each of a plurality of controllers is allocated to a respective channel and temporal interval, according to an embodiment of the present disclosure.

DETAILED DESCRIPTION

Hereinafter, the embodiments of the present disclosure are described with reference to the accompanying drawings. The following embodiments are examples in which the present disclosure are embodied, but, in nature, do not limit the technical scope of the present disclosure.

Figure 1:
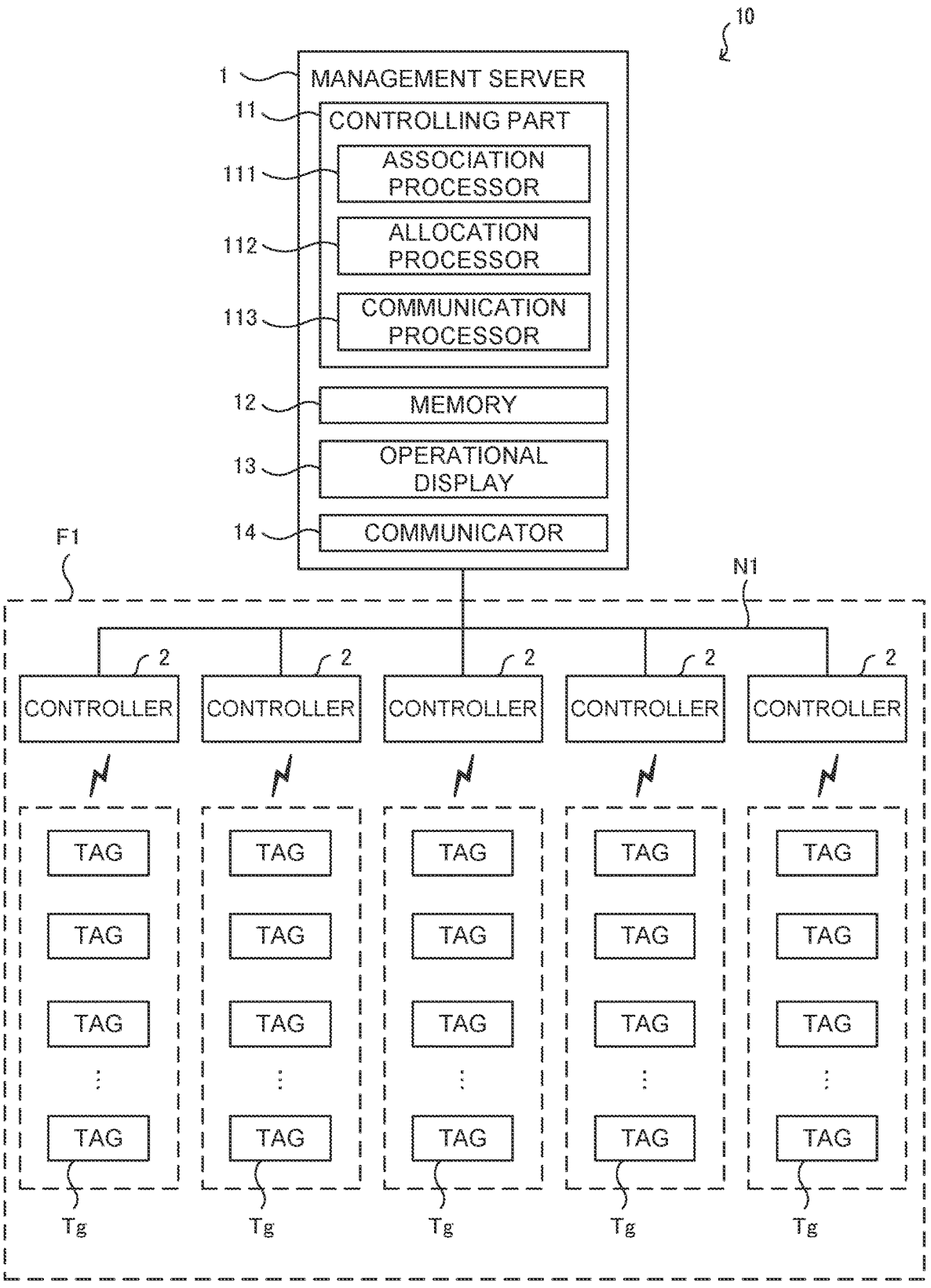
FIG. 1 is a functional block diagram illustrating an overall configuration of a communication system according to an embodiment of the present disclosure.

FIG. 1 is a functional block diagram illustrating an overall configuration of a communication system 10 according to an embodiment of the present disclosure.

Figure 2:
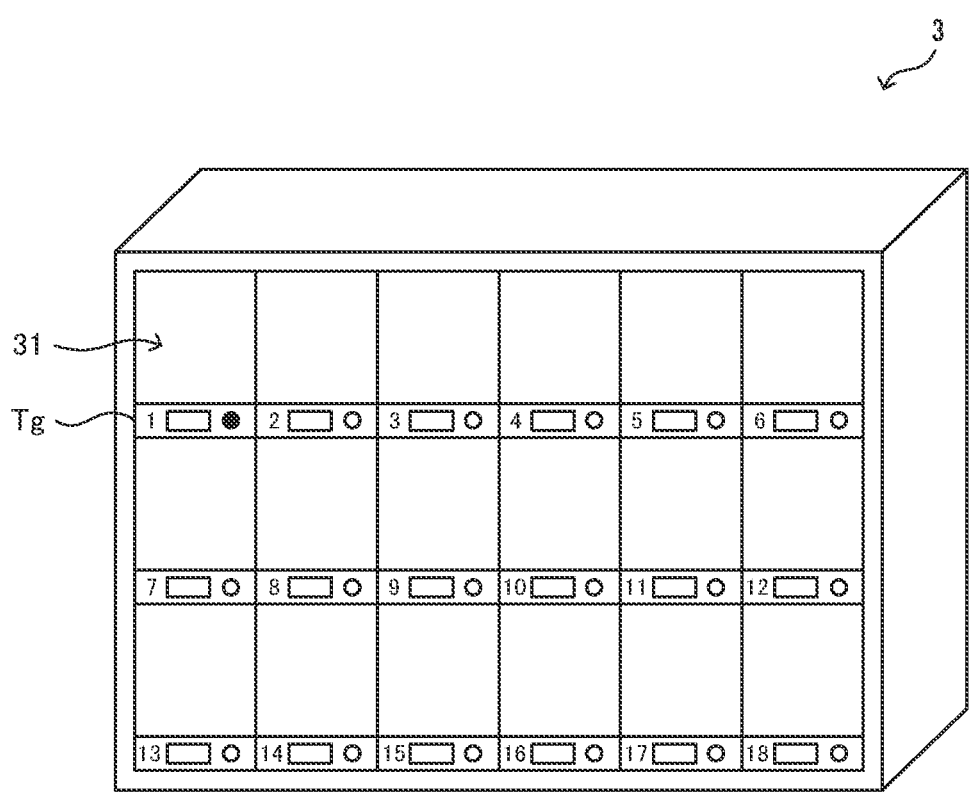
FIG. 2 is an external view of a storage shelf according to an embodiment of the present disclosure.

The communication system 10 includes a management server 1, a controller 2, and a tag Tg. For example, the communication system 10 is introduced in a work site (such as factory and warehouse) where an operator picks a target article from a storage shelf 3 (refer to FIG. 2) storing articles. The articles are not particularly limited, and include articles of various fields, such as parts, retail goods, drugs, books, documents, and miscellaneous goods. In the present embodiment, parts used in assembling a predetermined product (such as vehicle and electric appliance) are taken as an example of the articles. In other words, the communication system 10 in the present embodiment is introduced in a facility F1 (such as factory) where an operator picks a target article from the storage shelf 3 storing such parts.

Figure 3:
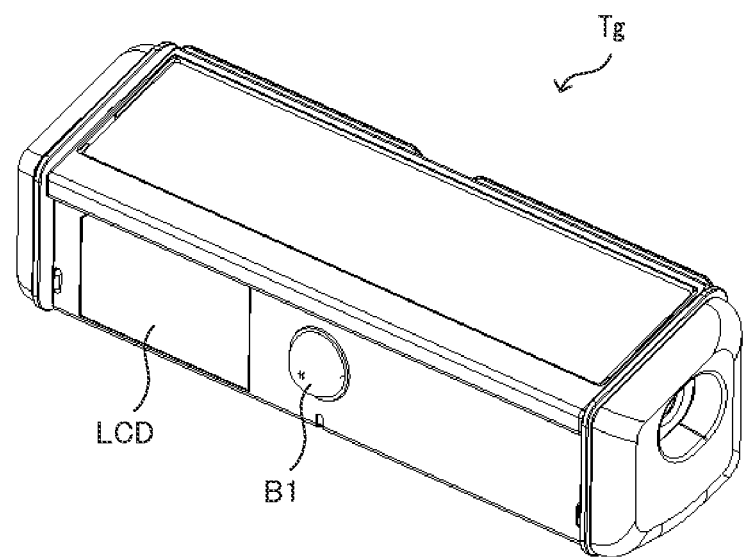
FIG. 3 illustrates a configuration of a tag provided for a storage shelf according to an embodiment of the present disclosure.

The management server 1 and a controller 2 are connected to each other via a network N1. The network N1 is a communication network such as the Internet, a local area network (LAN), a wide area network (WAN), or a public telephone line. A controller 2 and a tag Tg are connected to each other in the present communication method which utilizes radio waves. The tag Tg is provided in each storage space 31 (refer to FIG. 2) of the storage shelf 3. As illustrated in FIG. 3, a tag Tg includes a display (LCD) displaying a part's name, etc.; a lamp button B1 for lighting, flashing, and lighting out in a plurality of colors; and a communicator (not illustrated) communicating with the controller 2. The lamp button B1 has a button function, as a user interface. The tag Tg can cause a display to display predetermined information and cause the lamp button B1 to perform lighting and lighting out, according to an instruction (transmission data) from the controller 2. For example, the operator picks a part from the storage space 31 in which the tag Tg, whose lamp button B1 is lit, is provided. The tag Tg notifies the controller 2 in the present communication scheme that the lamp button B1 has been pushed, and the controller 2 notifies the management server 1 thereof. If the tag Tg corresponds to an intended part, the management server 1 sends, using the present communication scheme and via the controller 2, a signal to a tag Tg corresponding to a part to be taken out next, to prompt the lamp button B1 of the tag Tg to flash in a predetermined cycle. FIG. 3 illustrates a state in which a tag 1 is lit. The management server 1 collectively controls the controllers 2, and outputs, to a predetermined controller 2, a transmission instruction to transmit transmission data (such as a lighting instruction for lighting a tag Tg), based on the information on a target to be picked.

A plurality of storage shelves 3 are provided in the facility F1. A plurality of controllers 2 are dispersed in the facility F1, and the plurality of the controllers 2 communicate with the tags Tg in the plurality of storage shelves 3 provided in the facility F1. In this way, the communication system 10 constructs a picking system of the facility F1, by causing the plurality of controllers 2 to control the plurality of tags Tg provided in the facility F1. Specifically, the communication system 10 is a system managing so that radio wave communication between the plurality of controllers 2 and the plurality of tags Tg is performed in a predetermined cycle.

The management server 1 functions as a mediating station that manages and controls the controllers 2, each controller 2 functions as a host device, and each tag Tg functions as a slave device. The controller 2 is an example of a master station according to the present disclosure, and the tag Tg is an example of a slave station according to the present disclosure.

Management Server 1

As illustrated in FIG. 1, the management server 1 includes a controlling part 11, a memory 12, an operational display 13, and a communicator 14, or the like. For example, the management server 1 may be an information processor such as a personal computer. The management server 1 may also be configured by a cloud server.

The communicator 14 connects the management server 1 to the network N1, in a wired or wireless manner, and performs data communication with the controller 2 via the network N1, according to a predetermined communication protocol.

The operational display 13 is a user interface that includes a display, such as a liquid crystal display and an organic electro-luminescence (EL) display, which displays various types of information; and an operation acceptor, such as a touch panel, a mouse, or a keyboard, to be operated.

The memory 12 is a non-volatile memory, such as a hard disk drive (HDD), a solid state drive (SSD), and a flash memory, for storing various types of information. The memory 12 stores such data as tag information D1 and association information D2.

FIG. 4 illustrates an example of tag information D1. The tag information D1 has recorded therein information related to all the tags Tg provided in the facility F1. Specifically, the tag information D1 includes such information as a tag ID, position information, a part's name, etc. The tag ID is identification information of a tag Tg. The position information is information on a position in which a tag Tg is provided, which is, for example, information on a position of the storage shelf 3, a shelf number allocated to the storage shelf 3 (storage space 31), and coordinates of the facility F1 on a map. The part's name is a name of a part stored in the storage space 31 provided with the tag Tg.

The tag information D1 is registered by a manager of the facility F1, for example. The tag information D1 may be stored in a server different from the management server 1.

FIG. 5 illustrates an example of association information D2. The association information D2 is information to identify tags Tg associated with each of the plurality of controllers 2. Specifically, the association information D2 includes information such as a controller ID and a tag ID. The controller ID is identification information for identifying a controller 2, and the tag ID is identification information for identifying tags Tg. Note that, in reality, the most stable tags Tg in communication are associated with each controller 2, and therefore, the IDs of the tags Tg do not have any regularity but are random.

Figure 6:
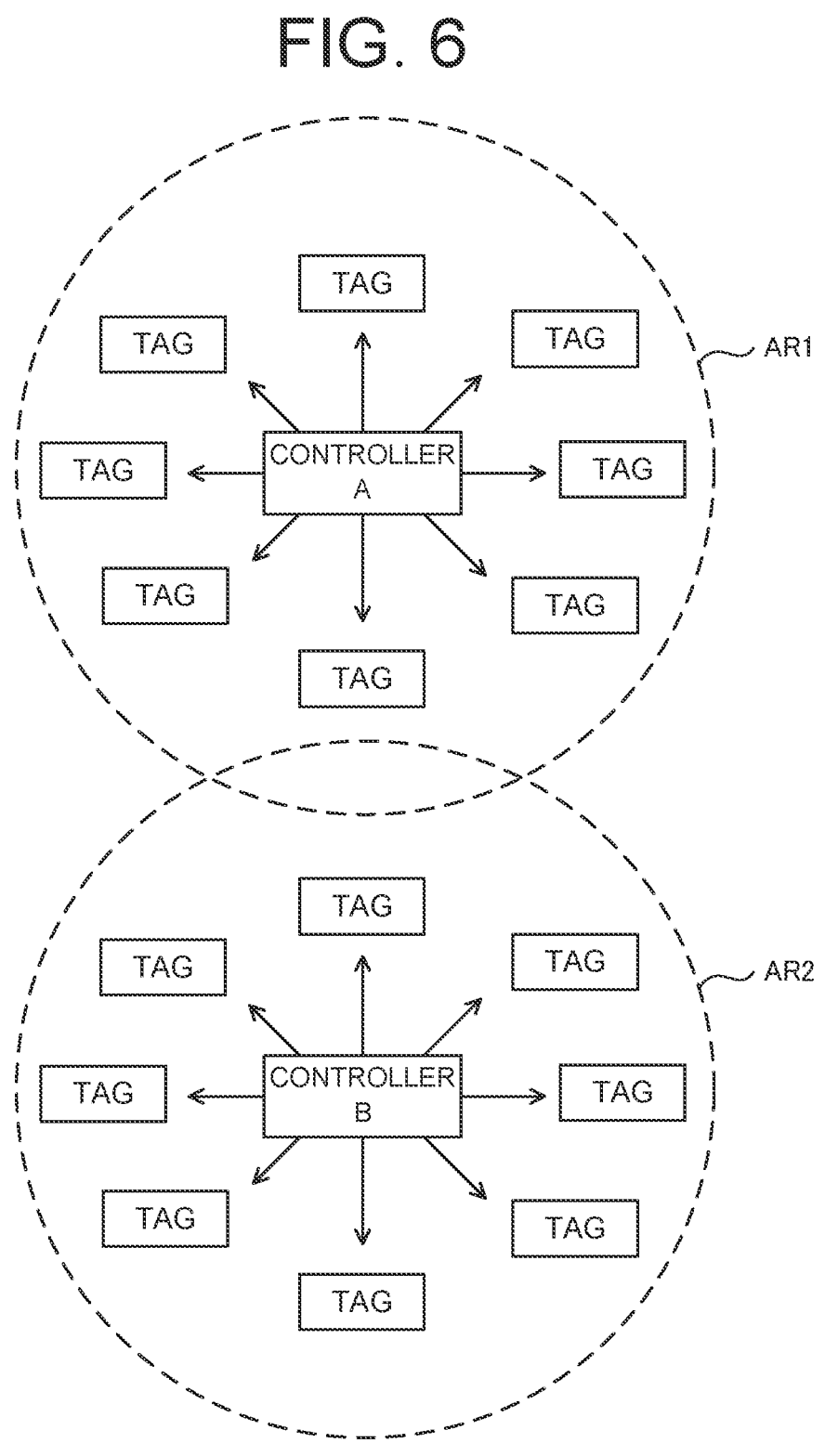
Figure 11:
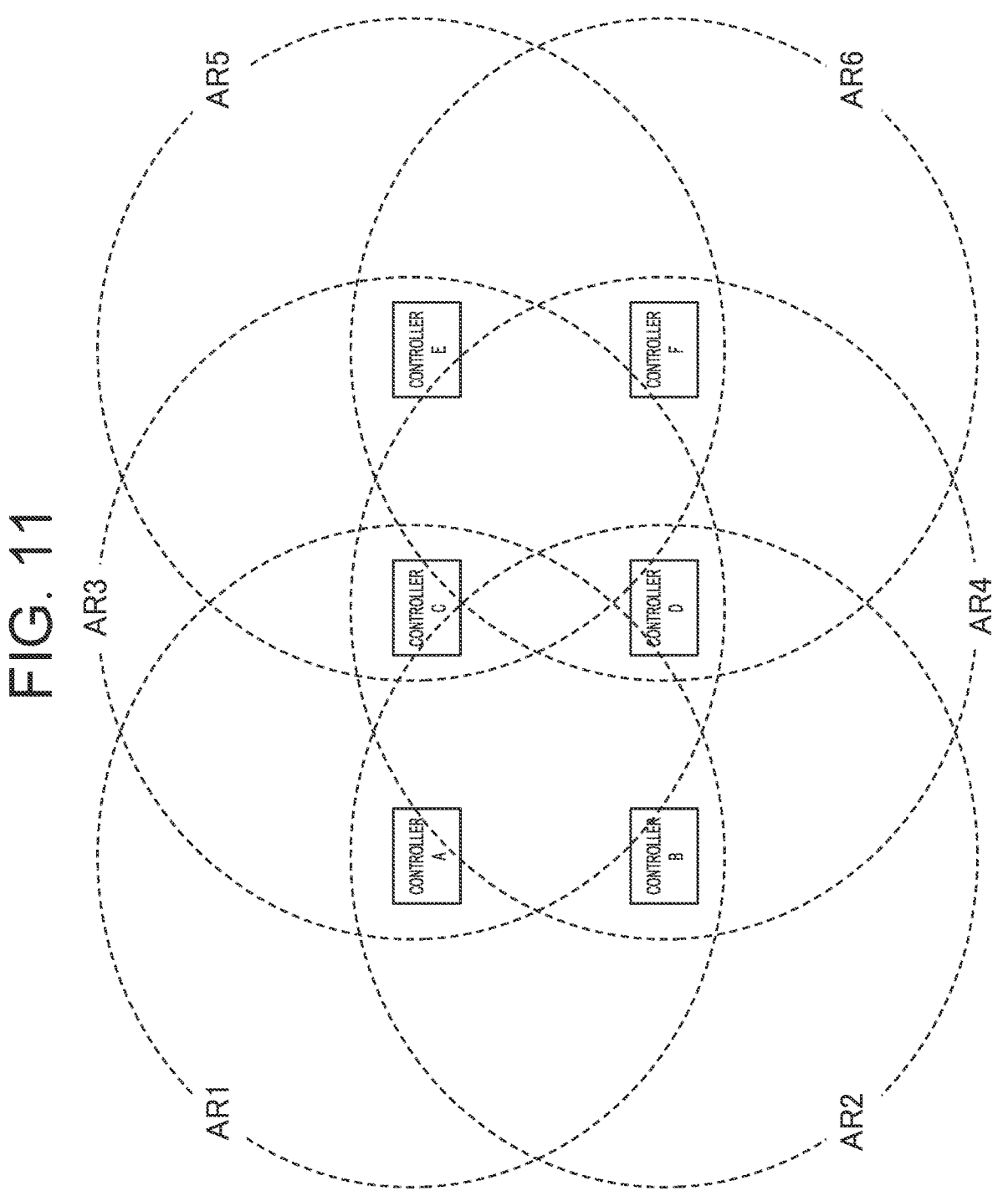
FIG. 11 illustrates a correspondence relationship between controllers and communication areas according to an embodiment of the present disclosure.

As illustrated in FIG. 6, a plurality of tags Tg are associated with a single controller 2. Each controller 2 can communicate with the plurality of tags Tg, and each tag Tg can communicate with a single controller 2. For example, a controller A can communicate with tags Tg within a communication area AR1, and a controller B can communicate with tags Tg within a communication area AR2. Note that, in reality, a single tag Tg enters the communication areas AR of a plurality of controllers 2 in many cases, as illustrated in FIG. 11, to expect sufficient communication stability. Each tag Tg is associated with the controller 2 which is most stable in communication, among these plurality of controllers 2; as a result, in the areas illustrated in FIG. 11, the radio waves of the plurality of controllers 2 interfere with one another. In the present embodiment, five controllers 2 (i.e., controllers A to E) cover the entire operation area of the facility F1, and can communicate with all the tags Tg in the facility F1. The association information D2 is registered by the later-described processing of the controlling part 11.

The memory 12 may also store picking information, which includes an order in which parts are taken out, for example. The picking information has registered therein, for each part to be picked, information on a tag ID, position information, and picking circumstances. The management server 1 registers information on a picking target in the picking information, on the basis of a picking instruction. Note that the management server 1 may obtain the picking instruction from a server which manages a manufacturing process of a product, or may generate the picking information, based on the manufacturing process stored in the memory 12.

The memory 12 also stores a control program, such as a communication program, for causing the controlling part 11 to execute later-described communication processing (refer to FIG. 10). For example, the communication program is non-temporarily stored in a computer-readable recording medium such as a compact disc (CD) or a digital versatile disc (DVD), and is read by a reader (not illustrated), such as a CD drive or a DVD drive, which is electrically coupled to the management server 1, to be stored in the memory 12.

The controlling part 11 has a controlling device such as a central processing unit (CPU). The CPU is a processor which executes various types of arithmetic processing. The controlling part 11 controls the management server 1 by executing, by means of the CPU, the various types of control programs stored in the memory 12 in advance.

Specifically, the controlling part 11 includes various types of processors, such as an association processor 111, an allocation processor 112, communication processor 113. Note that the controlling part 11 functions as the various types of processors, by executing, by means of the CPU, various types of processing according to the communication program. A part or all of the processors included in the controlling part 11 may be configured by an electric circuit.

The communication program may be a program to cause a plurality of processors to function as the various types of processors.

The association processor 111 associates each of the plurality of tags Tg, with one of the plurality of controllers 2.

For example as illustrated in FIG. 5, the association processor 111 associates a plurality of tags Tg having tag IDs "tg0001 to tg0100" provided in a communication area AR1, with a controller A having a controller ID "c0001" provided in the communication area AR1. The association processor 111 associates a plurality of tags Tg having tag IDs "tg0101 to tg0200" provided in a communication area AR2, with a controller B having a controller ID "c0002" provided in the communication area AR2. The association processor 111 associates a plurality of tags Tg having tag IDs "tg0201 to tg0300" provided in a communication area AR3, with a controller C having a controller ID "c0003" provided in the communication area AR3. The association processor 111 associates a plurality of tags Tg having tag IDs "tg0301 to tg0400" provided in a communication area AR4, with a controller D having a controller ID "c0004" provided in the communication area AR4. The association processor 111 associates a plurality of tags Tg having tag IDs "tg0401 to tg0500" provided in a communication area AR5, with a controller E having a controller ID "c0005" provided in the communication area AR5.

Note that the above-described association is performed by associating each tag Tg with the most stable controller 2 for the tag Tg, and thereafter assigning numbers as necessary. In the present disclosure, each of the plurality of slave stations may be associated with one of the plurality of master stations, in advance.

The association processor 111 registers the information on the controllers 2 and the tags Tg, associated with one another, in the association information D2 (refer to FIG. 5).

Figure 7:
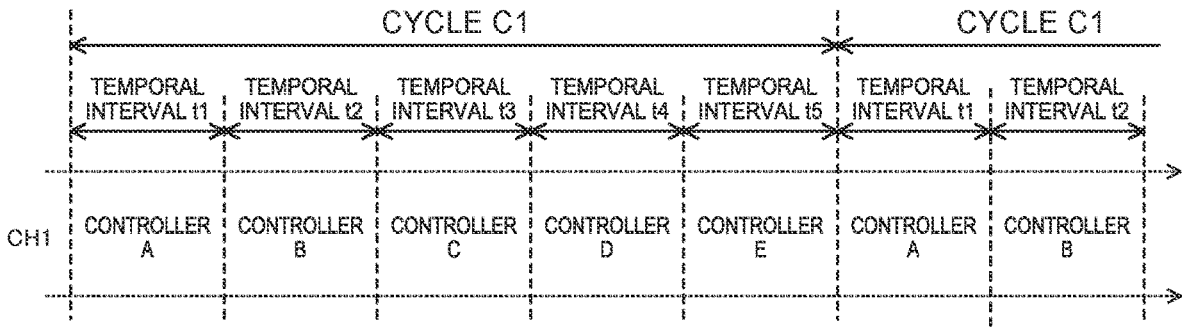
FIG. 7 illustrates an example of temporal intervals allocated to controllers according to an embodiment of the present disclosure.

The allocation processor 112 allocates each of the plurality of controllers 2 to one of the temporal intervals (time slot) resulting from time-dividing a predetermined cycle, in a predetermined channel. For example as illustrated in FIG. 7, when a cycle is "C1", the cycle C1 is divided into a plurality of temporal intervals. Here, the cycle C1 is assumed to be divided into five temporal intervals t1 to t5. Here, it is also assumed that a predetermined single channel CH1 is used. The number of controllers 2 communicable with the plurality of tags Tg are allocated for the channel CH1 in a predetermined cycle. For example, the allocation processor 112 allocates a controller A to a first temporal interval t1, a controller B to a second temporal interval t2, a controller C to a third temporal interval t3, a controller D to a fourth temporal interval t4, and a controller E to a fifth temporal interval t5.

The allocation processor 112 allocates the controllers A to E to the temporal intervals t1 to t5, in the stated order, in each cycle C1.

In each of the plurality of temporal intervals, the communication processor 113 causes a controller 2 to communicate with a plurality of tags Tg associated with the controller 2 by the association processor 111, within that temporal interval. The following describes a specific example of the communication method with reference to FIG. 8.

Figure 8:
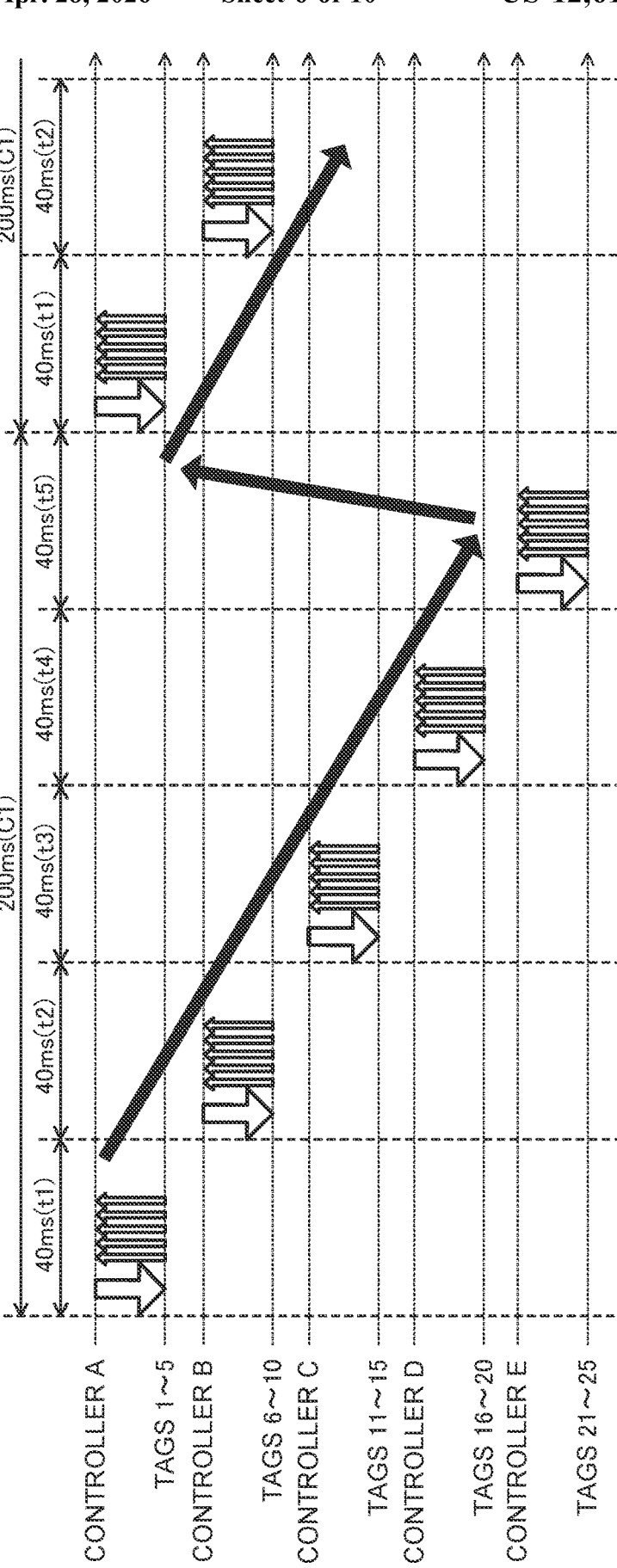
FIG. 8 illustrates a specific example of a communication method according to an embodiment of the present disclosure.

In an example illustrated in FIG. 8, in the channel CH1, a cycle C1 is assumed to be "200 ms", and a time width for each of temporal intervals t1 to t5 is assumed to be "40 ms". The communication processor 113 outputs, to the controller A, a transmission instruction to transmit transmission data, in the first temporal interval t1 of the cycle C1. The transmission data is a beacon, for example.

Figure 9:
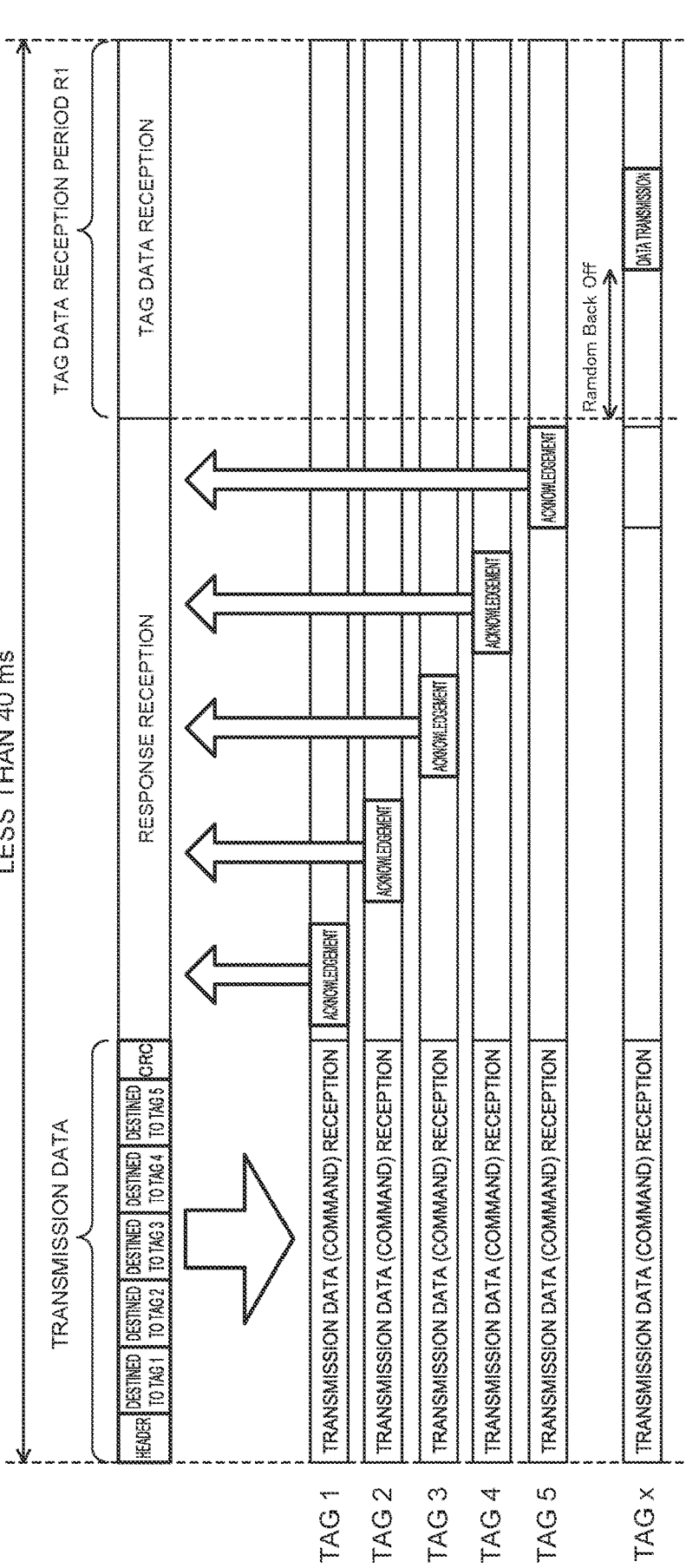
FIG. 9 illustrates a specific example of a communication method according to an embodiment of the present disclosure.

Here, as illustrated in FIG. 9, the transmission data includes information on a command (command information) to cause a tag Tg to execute predetermined processing; and identification information (destination information) to identify the tag Tg to execute the command. Specifically, the transmission data includes destination information of each of a predetermined number of tags Tg; and command information for causing each of the predetermined number of tags Tg to execute a predetermined command. For example, FIG. 9 illustrates an example of transmission data transmitted by the controller A. The communication processor 113 specifies five tags Tg (refer to FIG. 4) associated with the five parts to be picked, from among the plurality of tags Tg (refer to FIG. 5) associated with the controller A, and outputs, to the controller A, a transmission instruction to transmit transmission data, which includes the specified five tags 1 to 5 as the destination.

In other words, the communication processor 113 causes the controller A to transmit transmission data to a predetermined number of tags Tg, from among the plurality of tags Tg associated with the controller A. The controller A transmits the transmission data to the predetermined number of tags Tg communicable with the controller A within the temporal interval.

The controller A, when having obtained the transmission instruction from the management server 1, transmits the transmission data (refer to FIG. 9) to all the tags Tg associated with the controller A (refer to FIG. 5), within the first temporal interval t1 (refer to FIG. 8).

Each tag Tg associated with the controller A, when having received the transmission data, checks the destination included in the transmission data, and executes predetermined processing when a command destined to itself is included. For example, the tag 1, when having received the transmission data including a command destined to itself to light the lamp button B1 (refer to FIG. 3), lights the lamp button B1 (refer to FIG. 3), because the command destined to itself is included. In addition, the tag 1, when having executed the command, transmits a response (acknowledgement) to the controller A. Similarly, each of the tags 2 to 5, when having received the transmission data including the same command destined to itself, lights the lamp button B1 (refer to FIG. 3), because the command destined to itself is included, and transmits a response (acknowledgement) to the controller A. The controller A receives a response from each of the tags 1 to 5 (refer to FIG. 8). Here, the tags 1 to 5 perform transmission at an appropriate timing so as not to interfere with one another, depending on what number a command destined to itself is in the transmission data. In the present embodiment, each tag Tg transmits an acknowledgement of a same size in the order in which the command destined to itself is located in the transmission data, and refrains from transmitting their acknowledgement for a time period including the time required for the other tags Tg to transmit acknowledgement plus a predetermined margin, so that interference of the respective acknowledging signals is prevented.

Also in the present embodiment, a temporal interval is designed to have a tag data reception period R1 (refer to FIG. 9) after the transmission of acknowledgements of all the five tags Tg, and a tag Tg, for which a button function of a lamp is pushed, performs transmission in the Carrier Sense Multiple Access with Collision Avoidance (CSMA/CA) scheme within the subsequent tag data reception period R1. The tag data reception period R1 illustrated in FIG. 9 is an uplink period (from the tag Tg to the controller 2) according to the CSMA/CA scheme.

Note that the acknowledgement is not limited to button push information, and may be how other user interfaces, if any, are operated. In addition, a configuration is possible in which, if a tag Tg has a sensor function, the tag Tg autonomously performs the transmission when the measured value satisfies a predetermined condition.

When the controller A transmits the transmission data to the tags 1 to 5 in the first temporal interval t1 (40 ms) in the cycle C1 (200 ms) and when the command execution of the tags 1 to 5 completes, the communication processor 113 outputs, to the controller B, a transmission instruction to transmit transmission data (refer to FIG. 8), in the next second temporal interval t2 in the cycle C1 (200 ms). The transmission data includes the destinations and commands for the tags 6 to 10.

Each tag Tg associated with the controller B, when having received the transmission data, checks the destination included in the transmission data, and executes predetermined processing when a command destined to itself is included. For example, the tag 6, when having received the transmission data including a command destined to itself to light the lamp button B1 (refer to FIG. 3), lights the lamp button B1 (refer to FIG. 3), because the command destined to itself is included. In addition, the tag 6, when having executed the command, transmits a response (acknowledgement) to the controller B. Similarly, each of the tags 7 to 10, when having received the transmission data including the same command destined to itself, lights the lamp button B1 (refer to FIG. 3), because the command destined to itself is included, and transmits a response (acknowledgement) to the controller B. The controller B receives a response from each of the tags 6 to 10.

When the controller B transmits the transmission data to the tags 6 to 10 in the second temporal interval t2 (40 ms) in the cycle C1 (200 ms) and when the command execution of the tags 6 to 10 completes, the communication processor 113 outputs, to the controller C, a transmission instruction to transmit transmission data, in the next third temporal interval t3 in the cycle C1 (200 ms). The transmission data includes the destinations and commands for the tags 11 to 15 (refer to FIG. 8).

Each tag Tg associated with the controller C, when having received the transmission data, checks the destination included in the transmission data, and executes predetermined processing when a command destined to itself is included. For example, the tag 11, when having received the transmission data including a command destined to itself to light the lamp button B1 (refer to FIG. 3), lights the lamp button B1 (refer to FIG. 3), because the command destined to itself is included. In addition, the tag 11, when having executed the command, transmits a response (acknowledgement) to the controller C. Similarly, each of the tags 12 to 15, when having received the transmission data including the same command destined to itself, lights the lamp button B1 (refer to FIG. 3), because the command destined to itself is included, and transmits a response (acknowledgement) to the controller C. The controller C receives a response from each of the tags 11 to 15 (refer to FIG. 8).

When the controller C transmits the transmission data to the tags 11 to 15 in the third temporal interval t3 (40 ms) in the cycle C1 (200 ms) and when the command execution of the tags 11 to 15 completes, the communication processor 113 outputs, to the controller D, a transmission instruction to transmit transmission data, in the next fourth temporal interval t4 in the cycle C1 (200 ms). The transmission data includes the destinations and commands for the tags 16 to 20.

Each tag Tg associated with the controller D, when having received the transmission data, checks the destination included in the transmission data, and executes predetermined processing when a command destined to itself is included. For example, the tag 16, when having received the transmission data including a command destined to itself to light the lamp button B1 (refer to FIG. 3), lights the lamp button B1 (refer to FIG. 3), because the command destined to itself is included. In addition, the tag 16, when having executed the command, transmits a response (acknowledgement) to the controller D. Similarly, each of the tags 17 to 20, when having received the transmission data including the same command destined to itself, lights the lamp button B1 (refer to FIG. 3), because the command destined to itself is included, and transmits a response (acknowledgement) to the controller D. The controller D receives a response from each of the tags 16 to 20 (refer to FIG. 8).

When the controller D transmits the transmission data to the tags 16 to 20 in the fourth temporal interval t4 (40 ms) in the cycle C1 (200 ms) and when the command execution of the tags 16 to 20 completes, the communication processor 113 outputs, to the controller E, a transmission instruction to transmit transmission data, in the next fifth temporal interval t5 in the cycle C1 (200 ms). The transmission data includes the destinations and commands for the tags 21 to 25.

Each tag Tg associated with the controller E, when having received the transmission data, checks the destination included in the transmission data, and executes predetermined processing when a command destined to itself is included. For example, the tag 21, when having received the transmission data including a command destined to itself to light the lamp button B1 (refer to FIG. 3), lights the lamp button B1 (refer to FIG. 3), because the command destined to itself is included. In addition, the tag 21, when having executed the command, transmits a response (acknowledgement) to the controller E. Similarly, each of the tags 22 to 25, when having received the transmission data including the same command destined to itself, lights the lamp button B1 (refer to FIG. 3), because the command destined to itself is included, and transmits a response (acknowledgement) to the controller E. The controller E receives a response from each of the tags 21 to 25 (refer to FIG. 8).

When the controller E transmits the transmission data to the tags 21 to 25 in the fifth temporal interval t5 (40 ms) in the cycle C1 (200 ms) and when the command execution of the tags 21 to 25 completes, the communication processor 113 outputs, again to the controller A, a transmission instruction to transmit transmission data, in the first temporal interval t1 in the next cycle C1 (200 ms). The transmission data includes the destinations and commands for the tags 1 to 5.

Each tag Tg associated with the controller A, when having received the transmission data, checks the destination included in the transmission data, and executes predetermined processing when a command destined to itself is included. For example, the tag 1, when having received the transmission data including a command destined to itself to light the lamp button B1 (refer to FIG. 3), lights the lamp button B1 (refer to FIG. 3), because the command destined to itself is included. In addition, the tag 1, when having executed the command, transmits a response (acknowledgement) to the controller A. Similarly, each of the tags 2 to 5, when having received the transmission data including the same command destined to itself, lights the lamp button B1

(refer to FIG. 3), because the command destined to itself is included, and transmits a response (acknowledgement) to the controller A. The controller A receives a response from each of the tags 1 to 5 (refer to FIG. 8).

As described above, the communication processor 113, in each of the plurality of temporal intervals, causes a controller 2 and a plurality of tags Tg associated with the controller 2 to communicate with each other, within that temporal interval. In addition, the communication processor 113 outputs, to each of the plurality of controllers 2, the transmission instruction to transmit transmission data, in the order of the temporal intervals. Accordingly, each of the controllers A to E communicates with the tag Tg controlled by each of the controllers A to E, in the order of the temporal intervals t1 to t5.

For example, in the first temporal interval t1, the controller A transmits the transmission data to five tags 1 to 5, among the plurality of tags Tg associated with the controller A; and then in the second temporal interval t2 subsequent to the first temporal interval t1, the controller B transmits the transmission data to five tags 6 to 10, among the plurality of tags Tg associated with the controller B.

In addition, in the first temporal interval t1, the controller A transmits the transmission data to the tags 1 to 5, and the controller A receives a response thereto from the tags 1 to 5. Then in the second temporal interval t2, the controller B transmits the transmission data to the tags 6 to 10.

Here, the controlling part 11 performs processing to synchronize (time synchronization) the management server 1 and each controller. In addition, each controller 2 executes processing to synchronize (time synchronization) with the corresponding tags Tg. As a result, each controller 2 transmits transmission data to a tag Tg in a predetermined cycle (e.g., 200 ms), and each tag Tg receives the transmission data in a predetermined cycle (e.g., 200 ms). For example, each tag Tg starts activation in preparation for a reception time at which the transmission data is received, and starts receiving the transmission data at the reception time. Each tag Tg completes the reception processing by a transmission completion time at which transmission of the transmission data completes in the controller 2, and performs time synchronization after completion of the reception processing. Each tag Tg waits (power saving) by setting a timer until the reception time of the transmission data.

Note that the time synchronization between each controller 2 may be autonomously performed between each controller 2 according to the IEEE 1588 Precision Time Protocol, for example. In addition, the communication processor 113 may notify each controller 2 of the cycle C1 and the temporal intervals t1 to t5, and control each controller 2 to perform communication at the timing illustrated in FIG. 7.

Communication Processing

Figure 10:
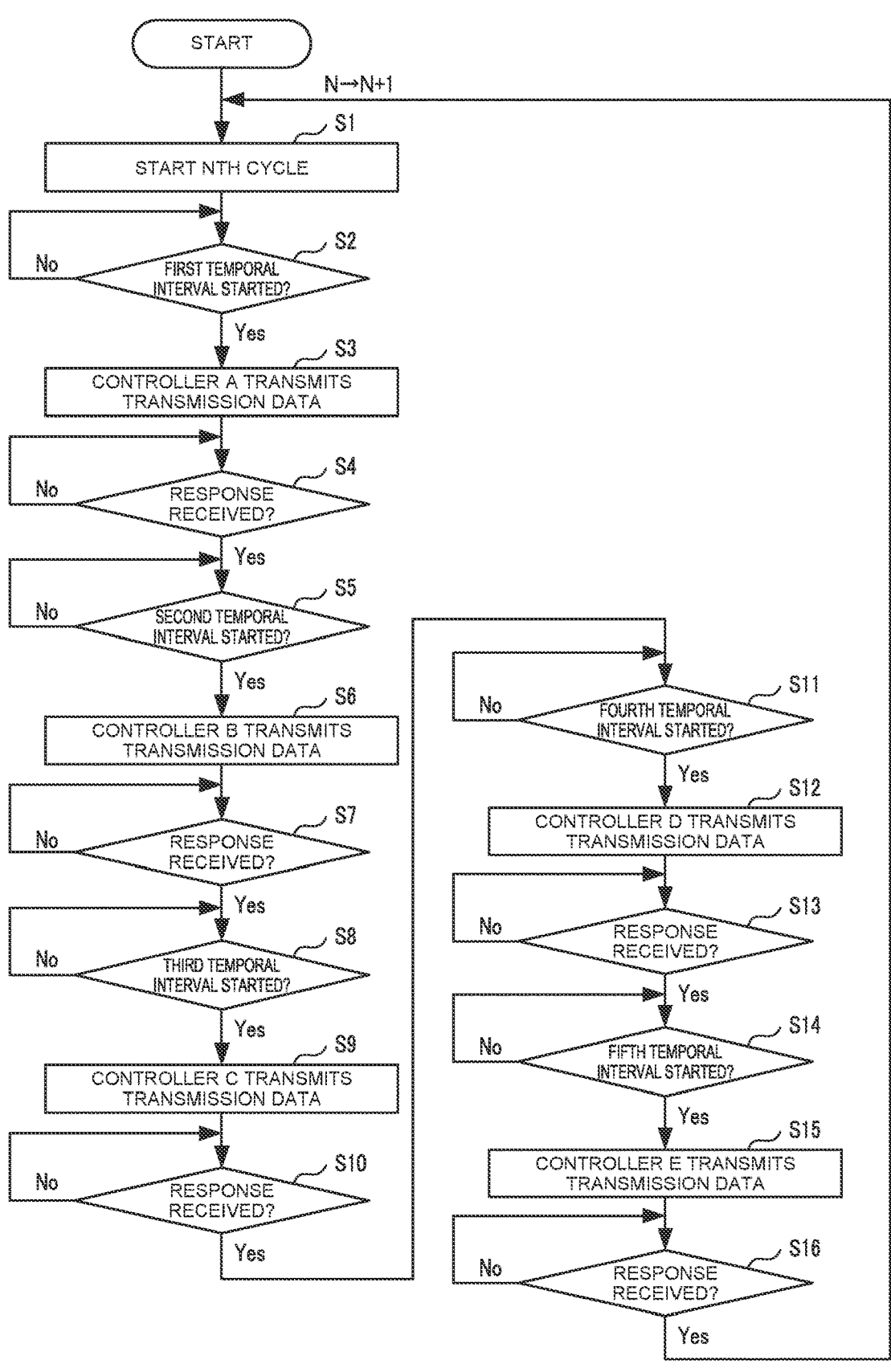
FIG. 10 is a flowchart for explaining an exemplary procedure of communication processing executed in the communication system according to an embodiment of the present disclosure.

The following describes an exemplary procedure of communication processing executed in the communication system 10, with reference to FIG. 10.

Note that the present disclosure can be interpreted as disclosure of a communication method in which one or a plurality of steps in communication processing are executed, and one or a plurality of the steps included in the communication processing described herein may be omitted as necessary. The order of execution of the steps in the communication processing may differ to the extent that the similar effects are obtainable. Furthermore, the following takes an example in which the steps in the communication processing are executed by the management server 1 and the controller 2. However, the present disclosure can include, as another embodiment, such a communication method in which a plurality of processors execute steps in the communication processing in a distributed manner.

The following takes an example of the communication method described above with reference to FIGS. 8 and 9. The controlling part 11 of the management server 1 uses a predetermined channel CH1 to output a transmission instruction of transmission data (refer to FIG. 8) to each of the controllers A to E having been allocated to five temporal intervals t1 to t5 (40 ms each), where the five temporal intervals t1 to t5 result from time-division of the predetermined cycle (200 ms).

First, when a first cycle (N=1) starts (S1), in step S2, the controlling part 11 determines whether the first temporal interval t1 has started. When the first temporal interval t1 has started (S2: Yes), in step S3, the controlling part 11 outputs, to the controller A, a transmission instruction to transmit transmission data. The controller A, having obtained the transmission instruction, transmits the transmission data including tags Tg to execute the command (e.g., tags 1 to 5) as a destination, to all the tags Tg associated with the controller A (refer to FIG. 5).

Next, in step S4, the controlling part 11 determines whether responses (acknowledgement) of the tags Tg have been received. For example, when the tags 1 to 5 receive the transmission data, execute a command (lighting command) and transmit a response to the controller A, the controller A transmits the received responses to the management server 1. As a result, the controlling part 11 of the management server 1 receives the responses. When the controlling part 11 receives the responses (S4: Yes), the processing proceeds to step S5.

In step S5, the controlling part 11 determines whether the second temporal interval t2 has started. When the second temporal interval t2 has started (S5: Yes), in step S6, the controlling part 11 outputs, to the controller B, a transmission instruction to transmit transmission data. The controller B, having obtained the transmission instruction, transmits the transmission data including tags Tg to execute the command (e.g., tags 6 to 10) as a destination, to all the tags Tg associated with the controller B (refer to FIG. 5).

Next, in step S7, the controlling part 11 determines whether responses of the tags Tg have been received. For example, when the tags 6 to 10 receive the transmission data, execute a command (lighting command) and transmit a response to the controller B, the controller B transmits the received responses to the management server 1. As a result, the controlling part 11 of the management server 1 receives the responses. When the controlling part 11 receives the responses (S7: Yes), the processing proceeds to step S8.

In step S8, the controlling part 11 determines whether the third temporal interval t3 has started. When the third temporal interval t3 has started (S8: Yes), in step S9, the controlling part 11 outputs, to the controller C, a transmission instruction to transmit transmission data. The controller C, having obtained the transmission instruction, transmits the transmission data including tags Tg to execute the command (e.g., tags 11 to 15) as a destination, to all the tags Tg associated with the controller C (refer to FIG. 5).

Next, in step S10, the controlling part 11 determines whether responses of the tags Tg have been received. For example, when the tags 11 to 15 receive the transmission data execute a command (lighting command) and transmit a response to the controller C, the controller C transmits the received responses to the management server 1. As a result, the controlling part 11 of the management server 1 receives the responses. When the controlling part 11 receives the responses (S10: Yes), the processing proceeds to step S11.

In step S11, the controlling part 11 determines whether the fourth temporal interval t4 has started. When the fourth temporal interval t4 has started (S11: Yes), in step S12, the controlling part 11 outputs, to the controller D, a transmission instruction to transmit transmission data. The controller D, having obtained the transmission instruction, transmits the transmission data including tags Tg to execute the command (e.g., tags 16 to 20) as a destination, to all the tags Tg associated with the controller D (refer to FIG. 5).

Next, in step S13, the controlling part 11 determines whether responses of the tags Tg have been received. For example, when the tags 16 to 20 receive the transmission data, execute a command (lighting command) and transmit a response to the controller D, the controller D transmits the received responses to the management server 1. As a result, the controlling part 11 of the management server 1 receives the responses. When the controlling part 11 receives the responses (S13: Yes), the processing proceeds to step S14.

In step S14, the controlling part 11 determines whether the fifth temporal interval t5 has started. When the fifth temporal interval t5 has started (S14: Yes), in step S15, the controlling part 11 outputs, to the controller E, a transmission instruction to transmit transmission data. The controller E, having obtained the transmission instruction, transmits the transmission data including tags Tg to execute the command (e.g., tags 21 to 25) as a destination, to all the tags Tg associated with the controller E (refer to FIG. 5).

Next, in step S16, the controlling part 11 determines whether responses of the tags Tg have been received. For example, when the tags 21 to 25 receive the transmission data, execute a command (lighting command) and transmit a response to the controller E, the controller E transmits the received responses to the management server 1. As a result, the controlling part 11 of the management server 1 receives the responses. When the controlling part 11 receives the responses (S16: Yes), the processing returns to step 51.

When the processing has returned to step 51, a second cycle (N=2) starts, and in step S2, the controlling part 11 determines whether the first temporal interval t1 has started. When the first temporal interval t1 has started (S2: Yes), in step S3, the controlling part 11 outputs, to the controller A, a transmission instruction to transmit transmission data. The controller A, having obtained the transmission instruction, transmits the transmission data including tags Tg to execute the command (e.g., tags 1 to 5) as a destination, to all the tags Tg associated with the controller A (refer to FIG. 5). The processing hereafter is similar to those described above. In this way, the communication system 10 executes the communication processing.

As described so far, the communication system 10 according to the present embodiment is a communication system in which a plurality of controllers 2 (master station) wirelessly communicate with a plurality of tags Tg (slave station) in a predetermined cycle. The communication system 10 associates each of the plurality of tags Tg with one of the plurality of controllers 2. The communication system 10 also associates each of the plurality of controllers 2 with one of a plurality of temporal intervals (time slot) intervals (time slot) resulting from time-dividing the predetermined cycle in a predetermined channel. In each of the plurality of temporal intervals, the communication system 10 causes a controller 2 to communicate with the plurality of tags Tg associated with the controller 2, within that temporal interval.

In the above-described configuration, each controller 2 uses radio waves only in the temporal interval (40 ms) out of the cycle (e.g., 200 ms). In addition, by allocating (adjusting) the time during which the controllers 2 are allowed to use the radio waves, to avoid overlapping therea-mong, the plurality of controllers 2, up to the maximum of five controllers, can share a single channel (CH1). As a result, even in the case of FIG. 11 where the communication areas AR overlap with one another, a multitude of controllers 2 can be provided. For example, if the number of frequency channels is 20 in an area where radio waves interfere with one another, a hundred controllers 2 can be provided, which is five times the number of channels.

Depending on the factory layouts or the types of lines, there are cases in which channels are desirably allocated to the controllers 2, in consideration of the maximum number of channels that can be shared between the controllers 2. In such a case, such a display screen (UI) may be provided, in which the numbers for the controllers (e.g., 1 to 64) can be set and mapped on a table having the vertical line repre-senting a time slot (slot number) and the horizontal line representing a channel (frequency channel) as illustrated in FIG. 12. In other words, the controlling part 11 may display, to be visually identifiable, predetermine channels and pre-determined temporal intervals, to which a plurality of con-trollers 2 (master station) are allocated.

In addition, the transmission data includes destination information of a plurality of tags Tg. According to this configuration, each of a plurality of controllers 2 can use a single channel to communicate with a plurality of tags Tg, in each temporal interval allocated to the plurality of con-trollers 2, in each cycle. Therefore, a multitude of tags Tg can be provided in a wide range. In addition, a communi-cation amount increases in the communication system 10. As a result, a multitude of tags Tg can be provided by ensuring high-speed responsiveness in communication of the controllers 2 and the tags Tg.

In the communication system 10 according to the present embodiment, a plurality of controllers 2 (master station) mutually synchronize time, and perform communication within the temporal interval allocated by the allocation processor 112. The plurality of controllers 2 may be coupled with one another by wired communication.

When data in the tag Tg (slave station) is to be transmit-ted, the communication processor 113 causes the data to be transmitted to a controller 2 associated with the tag Tg, within the temporal interval allocated to the controller 2.

The data in the tag Tg to be transmitted is data observed in the tag Tg. In addition, the data observed in the tag Tg is data corresponding to how the user interface of the tag Tg is operated.

The present disclosure is not limited to the above-de-scribed embodiment, and may be embodiments as described follows. In an example, the communication system 10 may include a plurality of channels. In such a case, the allocation processor 112 allocates the plurality of controllers 2 respec-tively to the plurality of temporal intervals in each channel. As a result, five controllers A to E share a channel CH1, five controllers F to J share a channel CH2, five controllers K to O share a channel CH3, five controllers P to T share a channel CH4, and five controllers U to Y share a channel CH5. As in the above-described embodiment, each control-ler 2 communicates with a plurality of tags Tg in each of the plurality of temporal intervals resulting from time-dividing a predetermined cycle. According to this configuration, the providable number of controllers 2 can be increased depend-ing on the number of available channels. As a result, even more tags Tg can be provided.

In the above-described embodiment, a cycle of 200 ms is divided into five slots of 40 ms. However, this is merely an example; and the cycle, the number of division, and the slot time may be set as appropriate, by taking into consideration the time responsiveness, the power consumption, the num-ber of slave stations, the number of available frequency channels, the communication speed, etc. which are required for each intended use.

Also in the above-described embodiment, the manage-ment server 1 (mediating station) controls a plurality of controllers 2. However, in another embodiment, a specific controller 2, from among the controllers 2, may also func-tion as the management server 1. In such a case, the specific controller 2 functions as a master controller, and the other controllers 2 function as slave controllers. The master con-troller executes allocation processing to allocate each of the plurality of slave controllers to one of the plurality of temporal intervals in a predetermined channel, and commu-nication processing to cause each of the slave controllers to communicate with the plurality of tags Tg in each of the plurality of temporal intervals. The master controller trans-mits the transmission data to each slave controller in the order of the temporal intervals. Note that the controller 2 to function as the master controller may be interchanged, as necessary, depending on the communication state in the entire communication system 10.

As described above, the communication system according to the present disclosure may be configured by the entire communication system 10 (refer to FIG. 1) which includes the management server 1, the controller 2, and the tag Tg; may be configured by the management server 1 and the controller 2; or may be configured solely by the management server 1 or solely by the controller 2.

It is to be understood that the embodiments herein are illustrative and not restrictive, since the scope of the disclo-sure is defined by the appended claims rather than by the description preceding them, and all changes that fall within metes and bounds of the claims, or equivalence of such metes and bounds thereof are therefore intended to be embraced by the claims.

The invention claimed is:

1. A communication system in which a plurality of master stations wirelessly communicates with a plurality of slave stations in a predetermined cycle, a plurality of first slave stations of the plurality of slave stations being associated with a first master station of the plurality of master stations, the communication system comprising:

an allocation circuit that allocates the first master station to a first temporal interval of a plurality of temporal intervals resulting from a time-division of the prede-termined cycle in a predetermined channel; and a communication circuit that outputs, to the first master station, an instruction for transmitting transmission data, including command information for causing a predetermined process to be executed and identification information of a plurality of second slave stations, among the plurality of the first slave stations, that is to execute the command information, so as to cause the first master station to transmit the transmission data to the plurality of first slave stations within the first temporal interval, the first master station transmits the transmission data to the plurality of first slave stations within a data trans-mission period in the first temporal interval, and each of the plurality of second slave stations transmits an acknowledgment, for the transmission data, to the first master station, at a different time in the first temporal interval, within a response reception period after the data transmission period.

2. The communication system according to claim 1, wherein the plurality of master stations mutually synchronizes time, and performs communication in each of the plurality of temporal intervals allocated by the allocation circuit.

3. The communication system according to claim 1, wherein the plurality of master stations is coupled with one another by wired communication.

4. The communication system according to claim 1, wherein the communication circuit causes the first master station to transmit the transmission data to a predetermined number of first slave stations among the plurality of first slave stations associated with the first master station.

5. The communication system according to claim 4, wherein the plurality of second slave stations transmits, respectively, the acknowledgement in a time-exclusive manner within the first temporal interval.

6. The communication system according to claim 4, wherein the first master station transmits the transmission data to the predetermined number of first slave stations within the first temporal interval.

7. The communication system according to claim 4, wherein the communication circuit outputs, to each of the plurality of master stations, the instruction for transmitting the transmission data in an order of the plurality of temporal intervals.

8. The communication system according to claim 4, wherein after the first master station transmits the transmission data to the predetermined number of first slave stations in the first temporal interval, a second master station, that is different from the first master station, transmits the transmission data to a predetermined number of third slave stations, among the plurality of slave stations, associated with the second master station in a second temporal interval which is subsequent to the first temporal interval.

9. The communication system according to claim 8, wherein after the first master station transmits the transmission data to the predetermined number of first slave stations in the first temporal interval and the first master station receives the acknowledgment from the plurality of second slave stations, the second master station transmits the transmission data to the predetermined number of third slave stations.

10. The communication system according to claim 4, wherein a number of the plurality of master stations communicable with the plurality of slave stations in the predetermined cycle is allocated to the predetermined channel.

11. The communication system according to claim 1, wherein the communication system uses a plurality of channels, and the allocation circuit allocates, respectively, the plurality of master stations to the plurality of temporal intervals in each of the plurality of channels.

12. The communication system according to claim 1, wherein predetermined channels and predetermined temporal intervals, to which the plurality of master stations is allocated, are displayed in such a manner to be visually identifiable.

13. The communication system according to claim 1, wherein the communication circuit outputs the instruction for transmitting the transmission data in which the identification information of the plurality of second slave stations is arranged in an order, and each second slave station:

determines an order of the second slave station from the order of the identification information of the plurality of second slave stations in the transmission data, and transmits the acknowledgment to the first master station within the response reception period when a total time of a transmission time related to the transmission of the acknowledgment of a second slave station that is earlier in the order than the second slave station and a predetermined margin amount time has elapsed from an end of the data transmission period.

14. A communication method in which a plurality of master stations wirelessly communicates with a plurality of slave stations in a predetermined cycle, a plurality of first slave stations of the plurality of slave stations being associated with a first master station of the plurality of master stations, the communication method comprising:

allocating the first master station to a first temporal interval of a plurality of temporal intervals resulting from a time-division of the predetermined cycle in a predetermined channel; and outputting, to the first master station, an instruction for transmitting transmission data, including command information for causing a predetermined process to be executed and identification information of a plurality of second slave stations, among the plurality of first slave stations, that is to execute the command information, so as to cause the first master station to transmit the transmission data to the plurality of first slave stations within the first temporal interval, wherein the first master station transmits the transmission data to the plurality of first slave stations within a data transmission period in the first temporal interval, and each of the plurality of second slave stations transmits an acknowledgment, for the transmission data, to the first master station, at a different time in the first temporal interval, within a response reception period after the data transmission period.

15. A non-transitory computer-readable recording medium recording a communication program by which a plurality of master stations wirelessly communicates with a plurality of slave stations in a predetermined cycle, a plurality of first slave stations of the plurality of slave stations being associated with a first master station of the plurality of master stations, the communication program causing one or more circuits to perform:

allocating the first master station to a first temporal interval of a plurality of temporal intervals resulting from a time-division of the predetermined cycle in a predetermined channel; and outputting, to the first master station, an instruction for transmitting transmission data, including command information for causing a predetermined process to be executed and identification information of a plurality of second slave stations, among the plurality of first slave stations, that is to execute the command information, so as to cause the first master station to transmit the transmission data to the plurality of first slave stations within the first temporal interval, wherein the first master station transmits the transmission data to the plurality of first slave stations within a data transmission period in the first temporal interval, and each of the plurality of second slave stations transmits an acknowledgment, for the transmission data, to the first master station, at a different time in the first temporal interval, within a response reception period after the data transmission period.

* * * * *